(12) United States Patent
Renfro et al.

(10) Patent No.: US 7,496,964 B2
(45) Date of Patent: Feb. 24, 2009

(54) METHOD AND SYSTEM FOR AUTOMATED RISK MANAGEMENT OF RULE-BASED SECURITY

(75) Inventors: Chad Renfro, Midlothian, TX (US); Arun Sankaran, Allen, TX (US); Christina Murray, Plano, TX (US); Ajay Barve, Coppell, TX (US)

(73) Assignee: Bank of America Corporation, Charlotte, NC (US)

( * ) Notice: Subject to any disclaimer, the term of this patent is extended or adjusted under 35 U.S.C. 154(b) by 459 days.

(21) Appl. No.: 10/904,695

(22) Filed: Nov. 23, 2004

(65) Prior Publication Data
US 2006/0129587 A1    Jun. 15, 2006

(51) Int. Cl.
G06F 11/00 (2006.01)
G06F 12/14 (2006.01)
G06Q 40/00 (2006.01)

(52) U.S. Cl. .............................. 726/25; 726/22; 705/38
(58) Field of Classification Search ................ 726/22, 726/25; 705/38
See application file for complete search history.

(56) References Cited

U.S. PATENT DOCUMENTS

2004/0024693 A1* 2/2004 Lawrence ................. 705/38
2004/0267660 A1* 12/2004 Greenwood et al. .......... 705/38
2005/0262544 A1* 11/2005 Brooks et al. ................ 726/11
2006/0015934 A1* 1/2006 Wool ........................... 726/11

FOREIGN PATENT DOCUMENTS

WO     WO 0180043 A2 * 10/2001

OTHER PUBLICATIONS

Fussell, L.; Field, S; "The role of the risk management database in the risk management process" Systems Engineering, 2005 ICSEng 2005. 18th International Conference on Aug. 16-18, 2005 pp. 364-369.*

* cited by examiner

Primary Examiner—Matthew B Smithers
Assistant Examiner—Courtney D Fields
(74) Attorney, Agent, or Firm—Charles L. Moore; Michael A. Springs; Moore & Van Allen, PLLC

(57) ABSTRACT

A method for automated risk management may include presenting a rule request graphical user interface (GUI) for a requester to enter information related to a rule request for a rule. The method may also include determining a risk rating score for the rule based on information entered in the rule request GUI. The information may include at least one of source information, destination information, service information and port information.

40 Claims, 18 Drawing Sheets

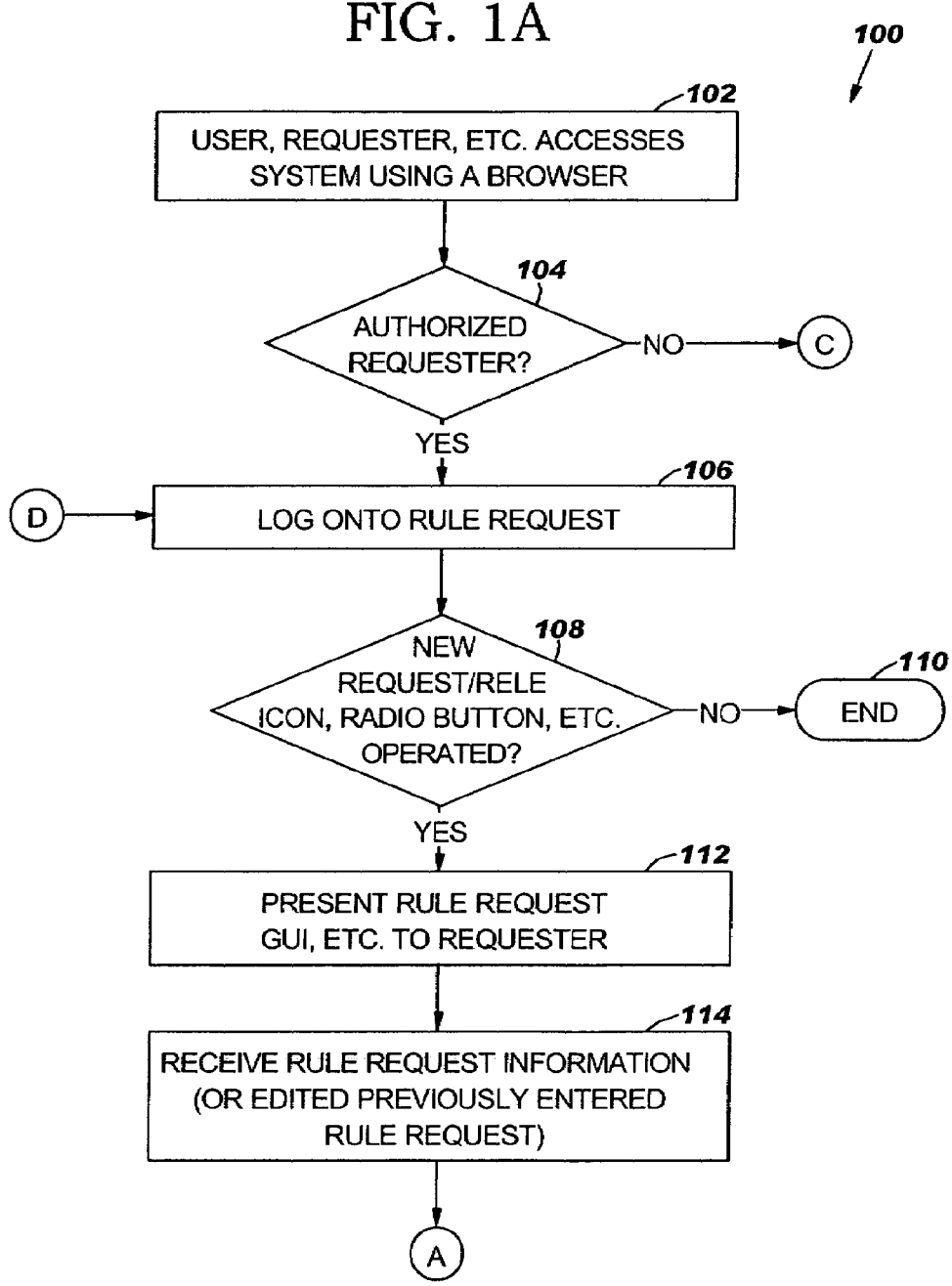

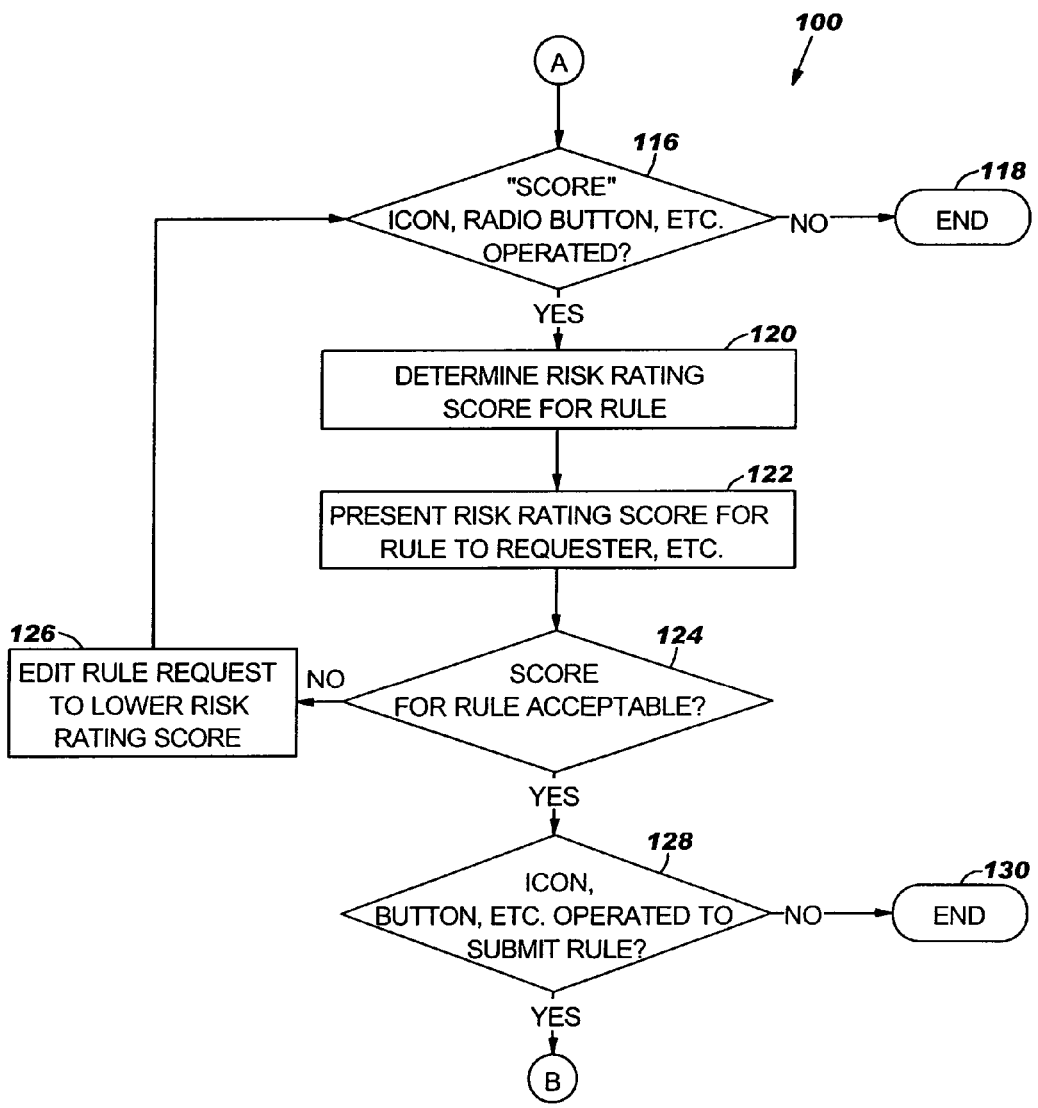

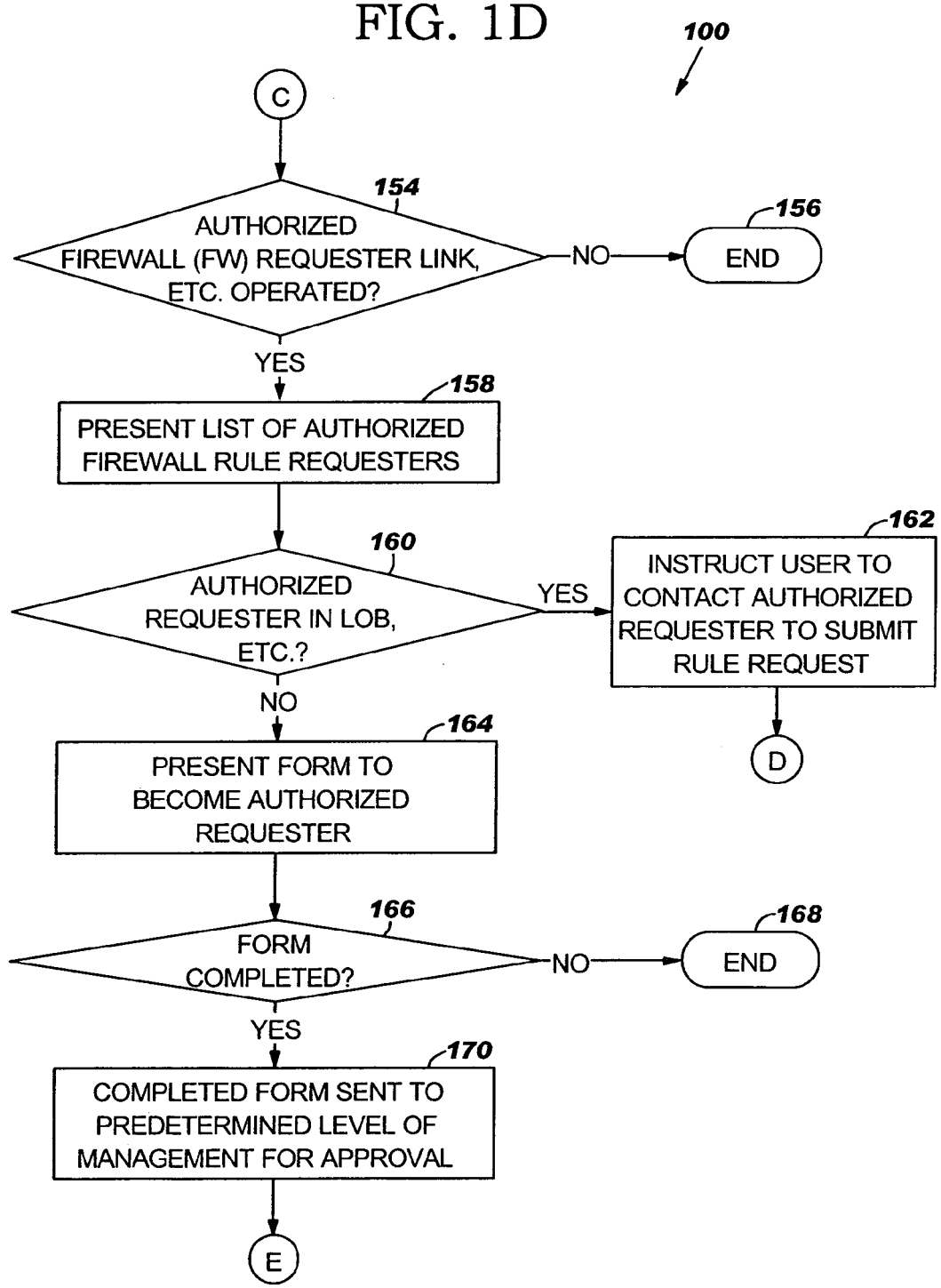

FIG. 2A

Corporate Information Security         NCG | CIS | eConnect

202 → E-Commerce Connectivity Team Documentation
Firewall Rule Request - Basic Information

Navigation
Home
Contact Us
Secure Area Access

Feedback Forms:
| Associate
Customer
ABC | Customer
XYZ Vendor Customer
Firewall
Intrusion Detection Rule Request:

Rule Requests List
Update Rule Password
Logoff

Enter new request below:         Instructions / HELP

First and Last Name [ ] 204
Telephone [ ] 206
E-Mail Address [ ] 208
Project Name [Test Project] 210
Date Required [04/30/04] mm/dd/yy 212
Termination Date [01/01/09] mm/dd/yy 214
CMR No. [ ] (for Differentiated Services only) 216

© 2004 Bank of America

| Ecomm Questionaires: Create New Update Existing | | |
|---|---|---|
| | Submit To | ⊙ Firewall - Differentiated Services  218<br>○ Firewall - Foundational Services  220 |
| | Change Type | ⊙ Planned<br>○ Unplanned<br>○ Emergency |
| | Access Type | ○ Internet DMZ  222<br>○ Business-to-Business/EBNC<br>○ CRM<br>○ GDC<br>○ Market Data<br>○ DMZ 2<br>   ☐ Production  224<br>   ☐ Pre-Production<br>   ☐ Development |
| | Have you previously worked with someone on this request/ project? If so, please list ---> | [scroll box] 226 |
| | Other Comments | |

[Save for Later] 228      [Add Rule ==>] 230

© 2004 Bank of America

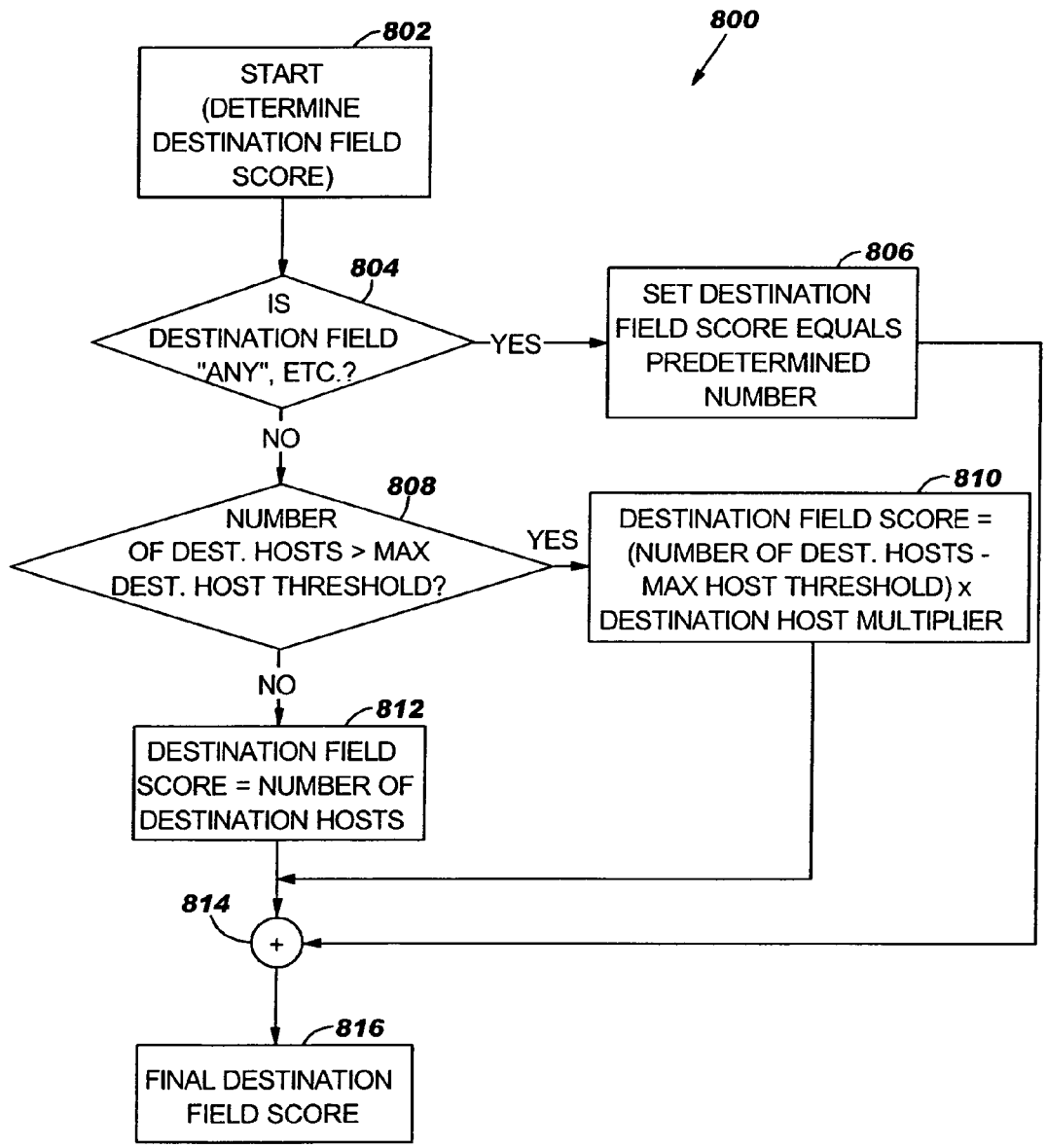

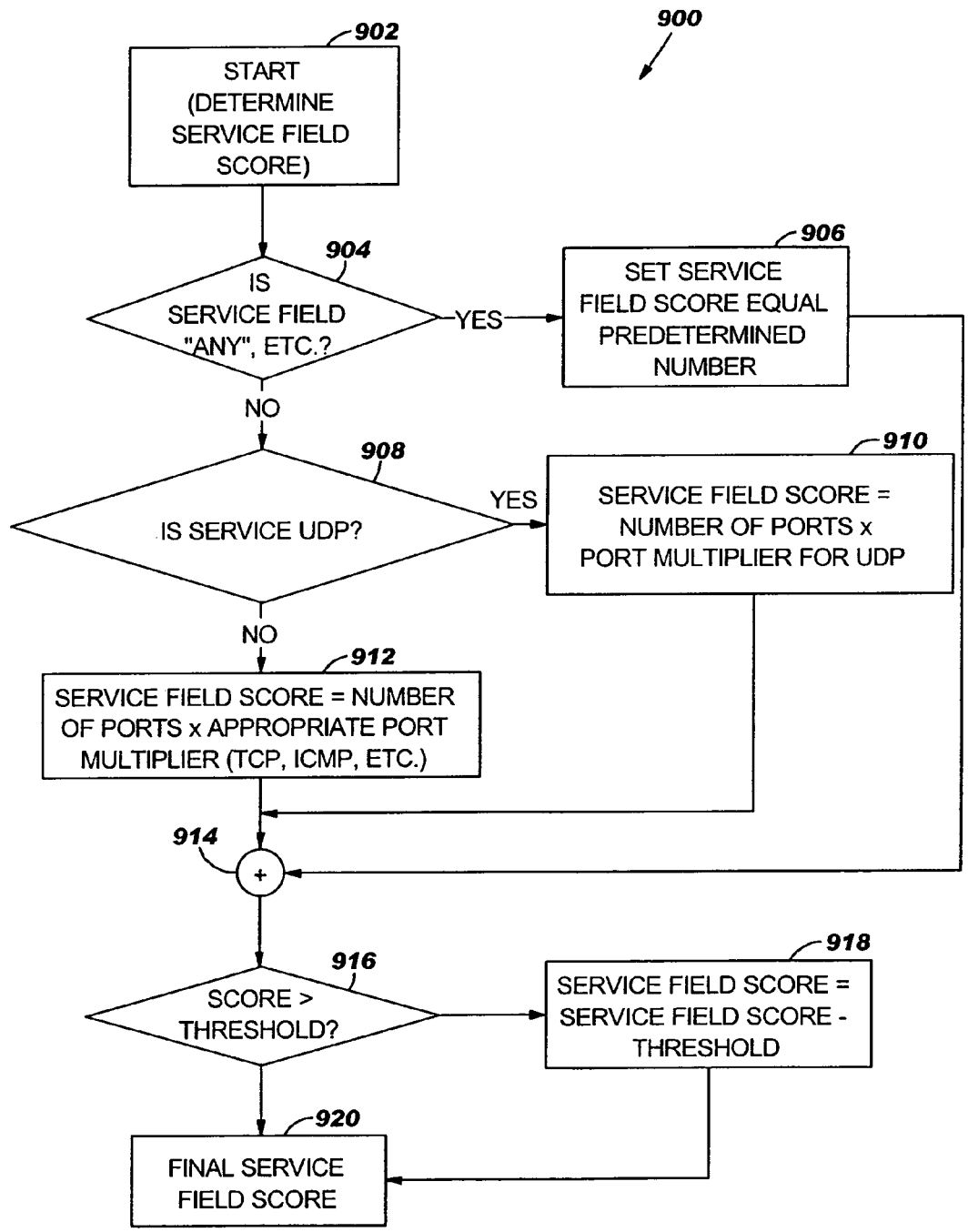

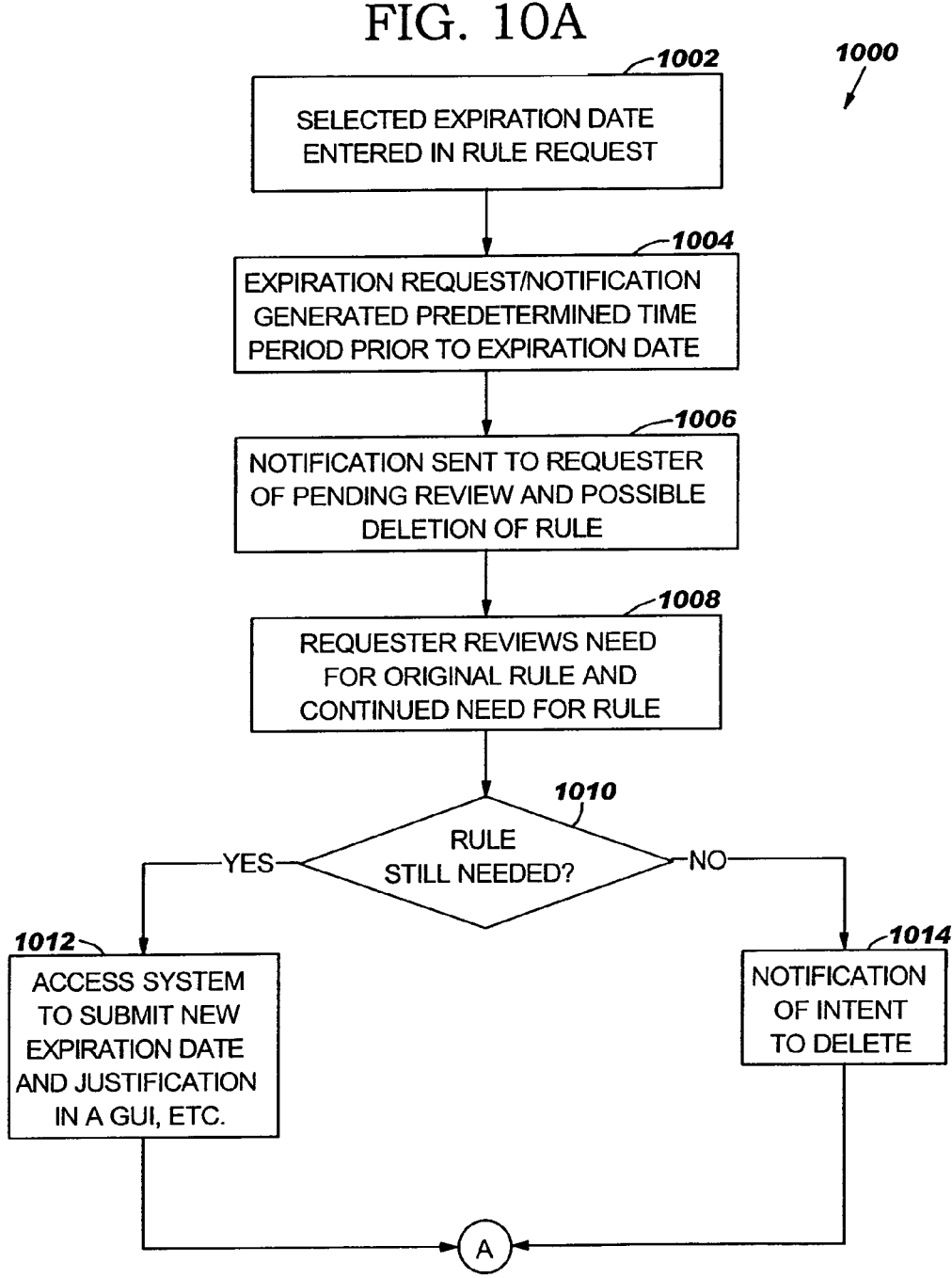

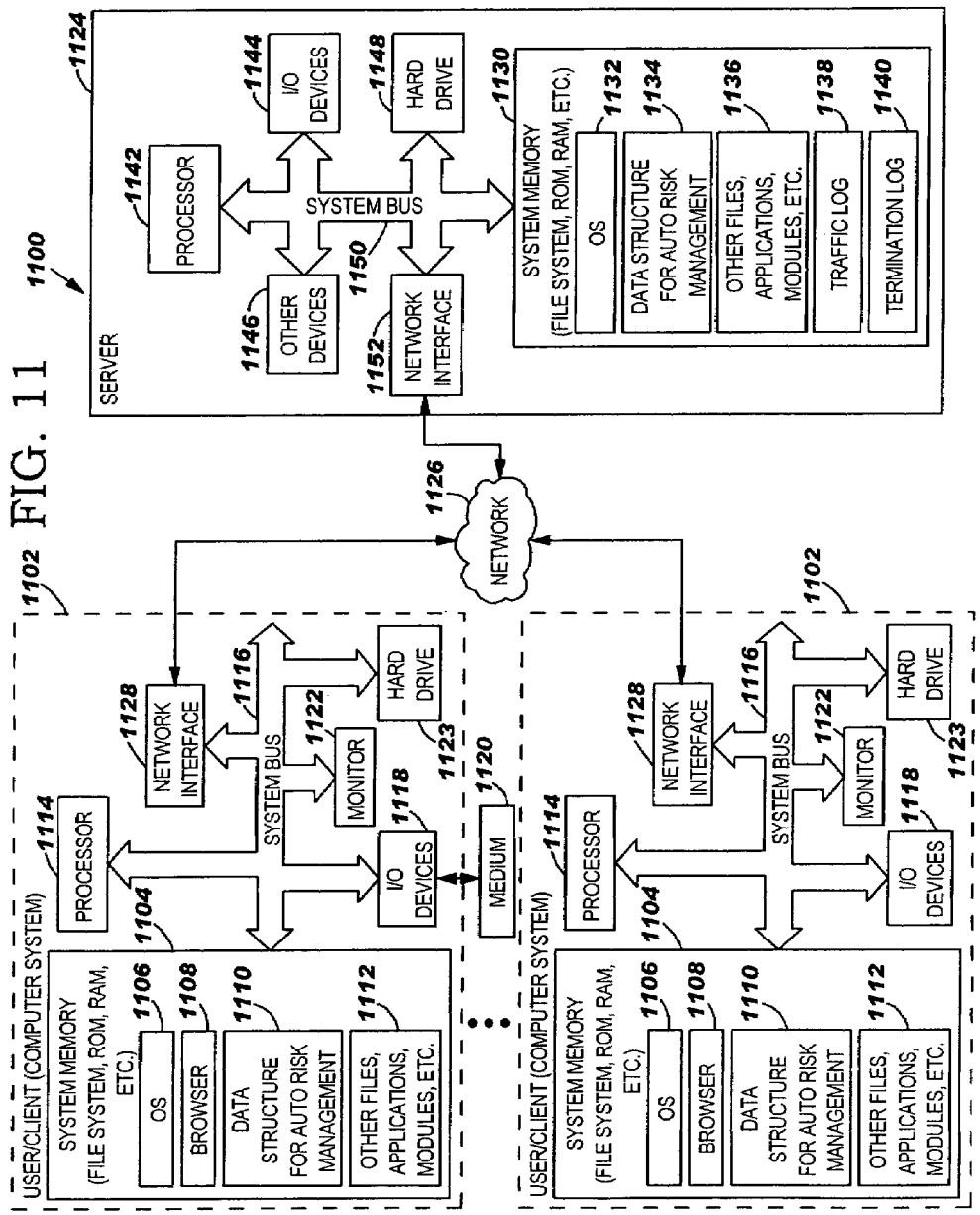

METHOD AND SYSTEM FOR AUTOMATED RISK MANAGEMENT OF RULE-BASED SECURITY

COPYRIGHT NOTICE

A portion of the disclosure of this patent document contains material that is subject to copyright protection. The copyright owner has no objection to the facsimile reproduction by anyone of the patent document, or the patent disclosure, as it appears in the Patent and Trademark Office patent files or records, but otherwise reserves all copyright rights whatsoever.

BACKGROUND OF INVENTION

The present invention relates to risk management, and more particularly to a method and system for automated risk management of rule-based security.

Maintaining the security of an organization's internal networks and data processing systems from unauthorized access, harmful attacks and the like can be extremely challenging. One means to prevent unauthorized access, harmful attacks and the like is an access control device or system, such as a firewall or similar device. Access control systems, such as firewalls, protect sensitive or confidential data by restricting access to the data and protect networks, systems and devices within the confines of the firewall from various attacks and exploits. There may even be multiple firewalls within an organization's system to further limit access to systems and highly sensitive data to only those having a need for access and who have appropriate authorizations.

Firewalls or like devices or systems typically reside between trusted or secure environments or networks and an un-trusted, unknown or insecure environments or networks, such as the World Wide Web or the Internet. Access through a firewall and authorized transmission of data or traffic through a firewall is typically managed by access rules explicitly defined in the firewall's rule base. The rules may specifically define what sources, destinations, services and the like are authorized or have restrictions. The sources, destinations and services associated with the rules can be extensive with varying levels of security. Additionally, the level of security can change over time. Further, the access rules are typically based on industry standards and these standards are constantly changing as new threats and problems arise. Accordingly, efficient, automated, user-friendly systems and processes for risk management of rule-based security related to access control systems, such as firewalls and similar devices or systems, is needed.

SUMMARY OF INVENTION

In accordance with an embodiment of the present invention, a method for automated risk management may include presenting a rule request graphical user interface (GUI) or the like for a requester to enter information related to a rule request for a rule. The method may also include determining a risk rating score for the rule based on information entered in the rule request GUI. The information may include at least one of source information, destination information, service information, port information or the like.

In accordance with another embodiment of the present invention, a method for automated risk management may include sending an expiration notification to a requester or surrogate a predetermined time period prior to an expiration date of a rule. The method may also include determining a validity of termination of the rule prior to disabling the rule.

In accordance with another embodiment of the present invention, a system for automated risk management may include a data structure operable on a processor to present a rule request GUI or the like for a requester to enter information related to a rule request for a rule. The system may also include a data structure operable on the processor to determine a risk rating score for the rule based on information entered in the rule request GUI. The information may include at least one of source information, destination information, service information, port information and similar information.

In accordance with a further embodiment of the present invention, a computer program product for automated risk management may include a computer readable medium having computer readable program code embodied therein. The computer readable medium may include computer readable program code configured to present a rule request GUI or the like for a requester to enter information related to a rule request for a rule. The computer readable medium may also include computer readable program code configured to determine a risk rating score for the rule based on information entered in the rule request GUI. The information may include at least one of source information, destination information, service information, port information or similar information.

DESCRIPTION OF THE DRAWINGS

FIGS. 1A-1E (collectively FIG. 1) are a flow chart of an example of a method for automated risk management in accordance with an embodiment of the present invention.

FIGS. 2A and 2B (collectively FIG. 2) are an example of a web page, graphical user interface (GUI) or the like of a rule request form for information in a risk management system in accordance with an embodiment of the present invention.

FIG. 8 is a flow chart of an example of a method for determining a destination field score in an automated risk management system in accordance with an embodiment of the present invention.

FIG. 9 is a flow chart of an example of a method for determining a service field score in an automated risk management system in accordance with an embodiment of the present invention.

FIGS. 10A, 10B and 10C (collectively FIG. 10) are a flow chart of an example of a method for reviewing a rule prior to expiration in an automated risk management system in accordance with an embodiment of the present invention.

FIG. 11 is a block diagram of an exemplary system for automated risk management in accordance with an embodiment of the present invention.

DETAILED DESCRIPTION

Figure 1C:
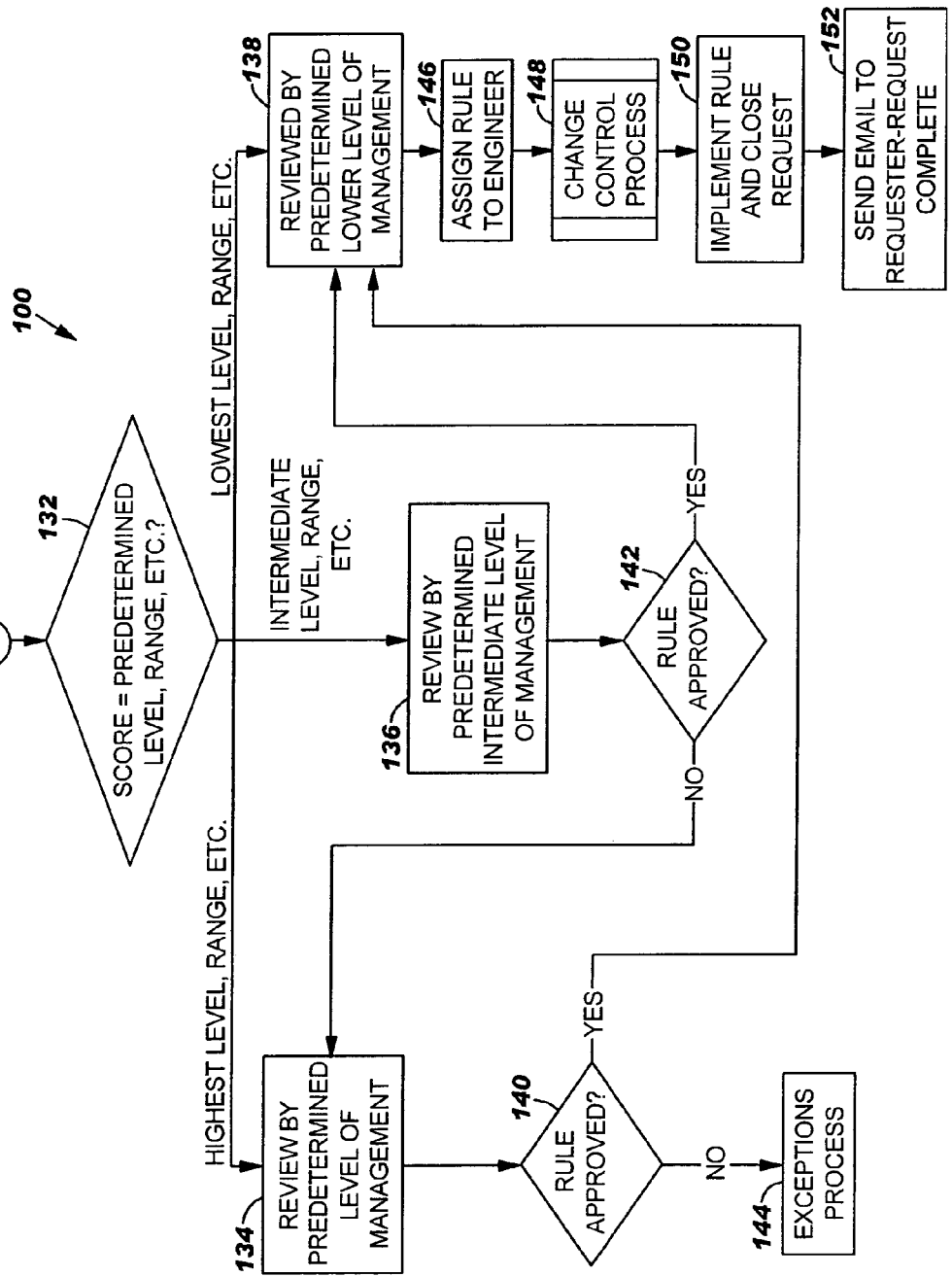
Figure 1E:
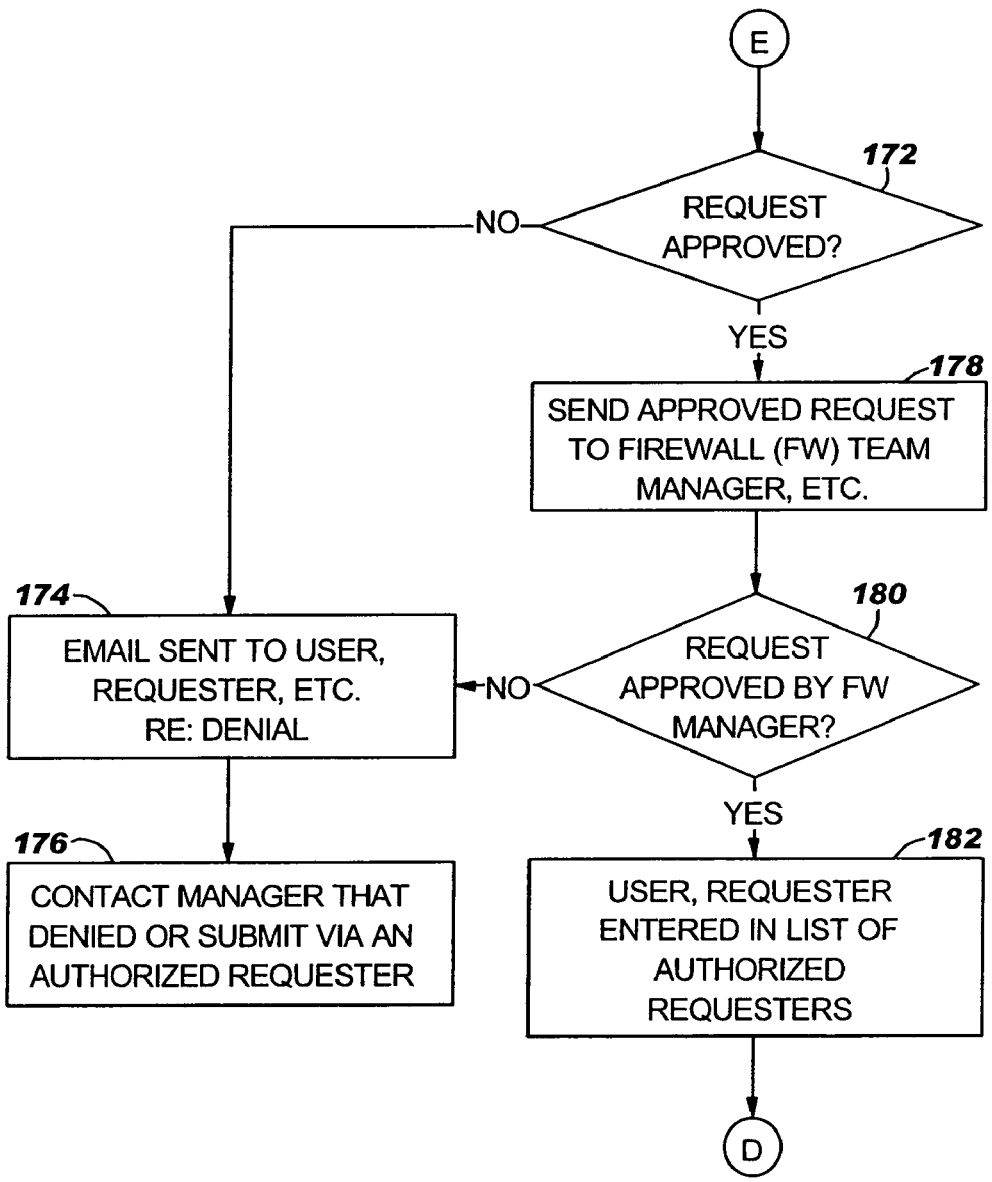

The following detailed description of preferred embodiments refers to the accompanying drawings, which illustrate specific embodiments of the invention. Other embodiments having different structures and operations do not depart from the scope of the present invention.

FIGS. 1A-1E (collectively FIG. 1) are a flow chart of an example of a method 100 for automated risk management in a risk management system in accordance with an embodiment of the present invention. In block 102, a user, requester or the like may access a system for risk management, such as system 1100 of FIG. 11 or a similar system, using a browser. A logon page or screen may be presented to the user to enter a user name and password. In block 104, a determination may be made whether the user is an authorized requester. If the user is not an authorized requester, a message or notification may be sent to the user to that effect and advising the user to have an authorized requester submit the rule request. The user may also be provided an option to request to become an authorized requester as described beginning at block 154 in FIG. 1D. This process is described in more detail hereinbelow with reference to FIG. 1D.

If the user is an authorized user in block 104, the method 100 may advance to block 106 and the user or requester may be provided access to the system and logged onto a rule request. The requester may be logged onto the rule request by operation or clicking-on an icon, tab, radio button or the like with a computer point device. In block 108, a determination may be made whether a new rule request icon, tab, radio button or the like has been operated. Alternatively, the requester may operate an icon, tab or radio button to edit a previously submitted rule or rule request. If no action is taken in block 108, the method 100 may end at termination 110.

If the requester has operated a new rule request icon in block 108, a rule request GUI, form or page may be presented to the requester in block 112. FIGS. 2A and 2B (collectively FIG. 2) are an example of a web page, GUI 200 or the like of a rule request form 202 for basic information in a risk management system in accordance with an embodiment of the present invention. The rule request form 202 may include fields for basic information, such as a field 204 for the first and last name of the requester, a telephone field 206, an e-mail address field 208, a project name field 210, a date required field 212 or date the rule is needed to be active, a termination date 214 and a CMR (Change Management Request) number field 216. The basic information GUI 200 or form 202 may also include a "Submit To" field 218 to select or enter the entity or organization to whom the rule request should be submitted for review and approval. A "Change Type" field 220 may be included in the GUI 200 to indicate or select a type of change, such as a planned change, an unplanned change, an emergency change or the like. An "Access Type" field 222 may be included for a requester to designate or select the type of access associated with the new rule. Examples of access type may include internal DMZ (Demilitarized Zone), business-to-business/EBNC (External Business Network Connectivity), CRM (Customer Relationship Management), GDC (Global Delivery Center), market data or similar access types. There may also be a field 224 to indicate if the requester has previously worked with someone in the rule approval and implementation process on the request and a field 226 to enter comments.

Figure 3:
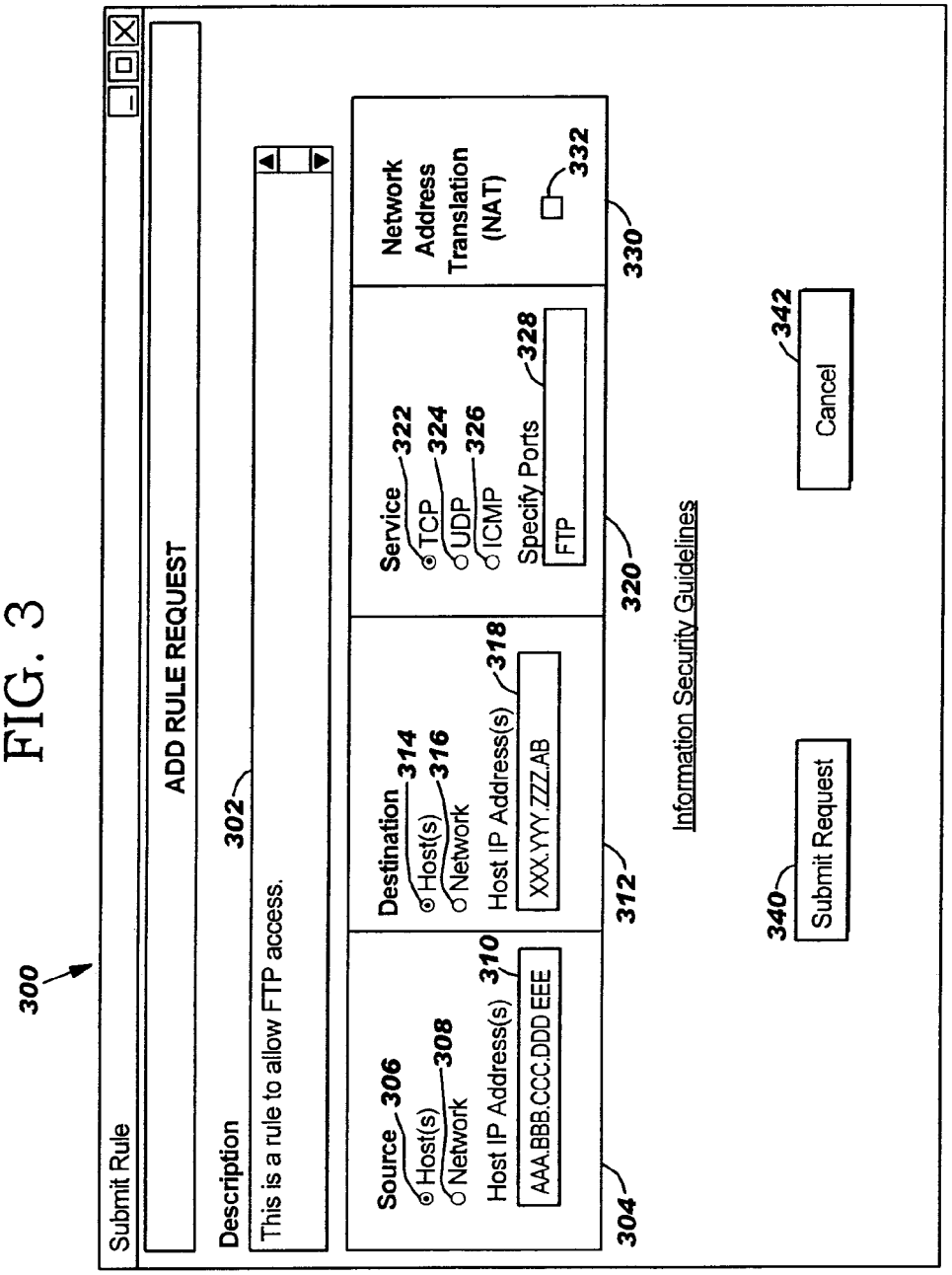
FIG. 3 is an example of a web page, GUI or the like of a rule request form for additional information related to a rule, such as source, destination and service information or similar information, in a risk management system in accordance with an embodiment of the present invention.

The rule request information in GUI 200 may be save for later further review, revision or processing by operating or clicking-on a radio button 228 that may be labeled "Save for Later." Alternatively, additional information related to the new rule may be added to the rule request by operating or clicking-on a radio button 230 that may be labeled "Add Rule." FIG. 3 is an example of a web page, GUI 300 or the like of a rule request form for additional information related to the rule, such as source, destination and service information or similar information, in a risk management system in accordance with an embodiment of the present invention. The "Add Rule Request" GUI 300 may be presented to the requester in response to operating the "Add Rule" button 230.

The "Add Rule Request" GUI 300 may include a field 302 labeled "Description" to enter a description of the rule. A source field 304 may be provided to specify a source or sources to be associated with the rule and from which traffic or data may be received through the access control system or firewall for which the rule is being requested. The source field 304 may include radio buttons 306 and 308 or the like that may be respectively labeled "Host(s)" and "Network" to select a host or hosts or a network as possible authorized sources. The "Host(s)" radio button 306 may be clicking-on or checked using a computer pointing device or like device to select a host or hosts as authorized sources. Alternatively the "Network" radio button 308 may be clicked-on or checked to select a network as a possible authorized source. A specific host internet protocol (IP) address or addresses or a range of IP addresses may be entered in a field or block 310 labeled "Host IP Address(es)."

If the "Network" radio button 308 is checked, a field or block that may be labeled "Network Address" and a second field or block that may be labeled "Netmask" may be presented in place of the "Host IP Address(es)" field or block 310. An example is shown in FIG. 4 where a "Network Address" field or block 418 and a "Netmask" field or block 419 may be presented to the requester in response to a "Network" radio button 416 being checked in a "Destination" field 412.

Returning to FIG. 3, a destination field 312 may be provided to specify a destination or destinations to be associated with the rule and which may receive may be authorized to receive traffic or data through the access control system or firewall. The destination field 312 may be similar to the source field 304. The destination field 312 may include radio buttons 314 and 316 respectively labeled "Host(s)" and "Network" to select either hosts or a network as possible authorized destinations for receiving traffic. A field or block 318 that may be labeled "Host IP Address(es)" may be provided for the requester to enter a specific host IP address or addresses or a range of host IP addresses.

Figure 4:
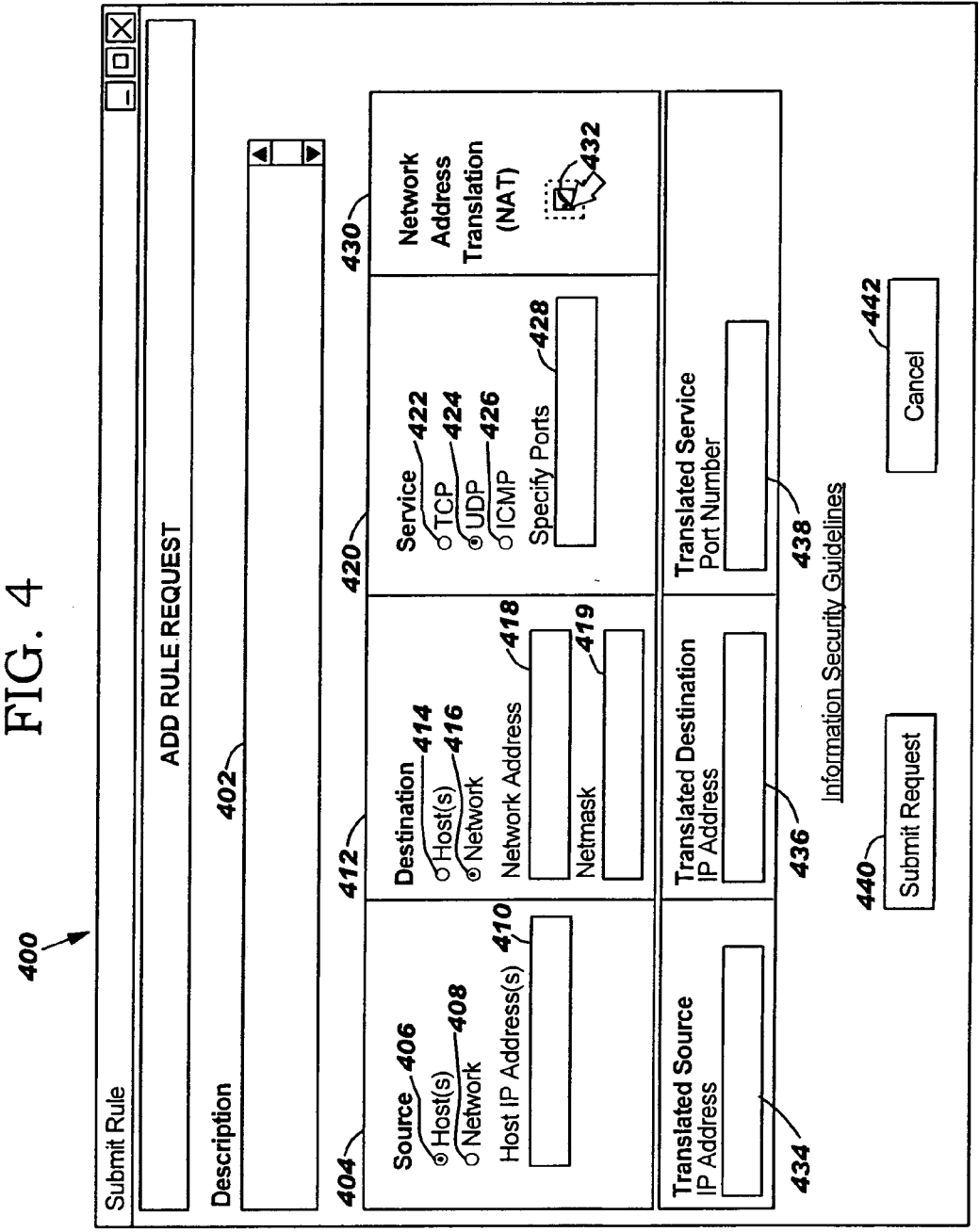
FIG. 4 is an example of a web page, GUI or the like of another rule request form for additional information, such as source, destination and service information or similar information, in a risk management system in accordance with another embodiment of the present invention.

Similar to that described with respect to the source field 304, if the "Network" radio button 316 is checked in the destination field 312, a block or field that may be labeled "Network Address," similar to block 418 in FIG. 4, may be presented to the requester to enter a network address as a specific destination. Another block or field that may be labeled "Netmask," similar to block or field 419 in FIG. 4, may also be presented to the requester to enter a specific netmask for destination purposes.

Returning to FIG. 3, the "Add Rule Request" GUI 300 may also include a service field 320 that may be labeled "Service" or a similar descriptive legend. The "Service" field 320 permits a requester to specify a type of service to be associated with the rule that is the subject of the rule request. Examples of the types of service that may be specified or selected include Transmission Control Protocol (TCP), User Datagram Protocol (UDP) and Internet Control Message Protocol (ICMP). A radio button 322-326 or similar means may be respectively associated with each type of service (TCP 322, UDP 324 and ICMP 326) to select the type of service to be associated with the rule. A field or block 328 that may be labeled "Specify Ports" may be included in the "Service" field 320 to enter specific ports associate with the type service selected in association with buttons 322-326.

FIG. 4 is an example of a web page, GUI 400 or the like of another rule request form for information, such as source, destination and service information or similar information, for a risk management system in accordance with an embodiment of the present invention. GUI 400 of FIG. 4 is similar to GUI 300 of FIG. 3 except to illustrate separate or additional fields that may be presented to a requester in response to selecting certain options as illustrated in GUI 400. As previously discussed, by selecting a "Network" radio button, such as button 416, a "Network Address" field or block 418 and a "Netmask" field or block 419 may be presented or displayed for a requester to enter specific network IP addresses and netmask information.

Also provided in "Add Rule Request" GUI 300 and 400 is an option 330 (FIG. 3) and 430 (FIG. 4) to select "Network Address Translation (NAT)". If a block 432 is checked as illustrated in FIG. 4, a "Translated Source" field 434, a "Translated Destination" field 436 and a "Translation Service" field 438 may be displayed or presented to the requester. The requester may enter an IP address in fields 434 and 436 or a port number in field 438.

The rule request may be submitted or entered into the system for further processing by clicking-on or operating a radio button 440 that may be labeled "Submit Request." Alternatively, the rule request may be canceled by operating or clicking-on another radio button 442 that may be labeled "Cancel."

Returning to FIG. 1A, in block 114, the rule request information or edited rule request information entered via GUIs or similar means, such as GUIs 200 and 300 or 400, may be received by the system. The rule request or edited rule request may be received in response to a requester clicking-on or operating the "Submit Request" radio button 340 (FIG. 3) or 440 (FIG. 4) as described above.

In block 116, an icon, radio button or similar means, that may be labeled "Score" or other descriptive label to indicate the function of the icon or button, may be presented to the requester by method 100. The "Score" icon or button may be operated or clicked-on by the requester using a computer pointing device, mouse or the like. If the "Score" icon or button is not operated, the method 100 may end at termination 118. If the "Score" icon or button is operated in block 116, the method 100 may advance to block 120. In block 120, a risk rating score for the rule may be determined or calculated. The risk rating score may be determined using the information entered into the rule request GUIs 200 and 300 or 400. Calculation or determination of the risk rating score for a rule will be described in detail herein with reference to method 600 in FIG. 6 and methods 700, 800 and 900 in FIGS. 7, 8 and 9, respectively.

In block 122, the risk rating score for the rule may be presented or displayed to the requester. In block 124, the requester may accept or reject the risk rating score. Alternatively, the risk rating score may be automatically rejected if the score exceeds a predetermined threshold and a warning message may be presented to the requester. If the risk rating score for the rule is not accepted in block 124 or a warning message is presented in the requester's browser, the method 100 may advance to block 126. In block 126, the requester may edit the rule request to attempt to lower the rating score and bring the score into acceptable limits. GUIs 200 and 300 or 400 may be accessed to edit the rule request.

If the risk rating score is acceptable in block 124, the method 100 may advance to block 128. In block 128, an icon, radio button or the like that may be labeled "Submit Rule" or a similar descriptive label may be presented to the requester by method 100. The "Submit Rule" radio button may be operated or clicked-on by the requester to submit the rule request for further review and implementation, if approved. If the "Submit Rule" icon or button is not operated in block 128, the method 100 may end at termination 130. If the "Submit Rule" icon is operated in block 128, the method 100 may advance to block 132.

The risk rating score may be translated to a particular color or designation based on a preset or predetermined level or range of the score. For example, on a scale of risk rating scores from about 0-100 with the larger number corresponding to a higher relative risk, a risk rating score of about 0-25 points may be designated as a "Green" score, a risk rating score of about 25-50 points may be designated as a "Yellow" score and a risk rating score of about 50-100 points may be designated as a "Red" score. In block 132, the rule request may be escalated to different predetermined levels of management based on the color or designation or a preset or predetermined level or range of the risk rating score. For example, a "Red" score or highest level or range of risk rating scores may be reviewed for approval by a highest predetermined level of management in block 134, such as by a Firewall Manger or similar level of management. A "Yellow" score or an intermediate level or range of risk rating scores may be reviewed for approval by a predetermined intermediate level manager in block 136, such as by a team manager or the like. A "Green" score or a lowest level or range of risk rating scores may be reviewed for approval by a lowest predetermined level of management in block 138, such as by an access coordinator or the like.

In block 140, a determination may be made if the highest predetermined level of management approved the rule request. If the rule request was approved in block 140, the rule request may be transferred to block 138 for processing by the lower level of management or the access coordinator. Similarly, if the intermediate level manger approves the rule request in block 142, the rule request may be transferred to the lower level manger or access coordinator in block 138. If the highest level manager rejects the rule request in block 140, the rule request may go to an exceptions process 144. The exceptions process 144 may include higher level review or review by a committee and further investigation or narrowing of the rule to meet business and security needs or considerations.

If the intermediate level manger rejects the rule request in block 142, the rule request may be transferred to the higher level manager in block 134 and the method 100 may proceed as previously described with respect to blocks 140 and 144.

In block 138, review by the lower level manager or access coordinator may include validating the rule to insure there are no inconsistencies or problems with other rules, organizational policies or the like. In block 146, the rule request may be assigned to an engineer to actually coordinate a change process in block 148 and implement the rule in block 150. In block 150, the rule request may also be closed out after implementation. In block 152, an e-mail may be automatically sent to the requester, in response to implementing and closing the rule request. The e-mail may advise the requester that the rule request has been implemented or is active.

Returning to block 104 in FIG. 1A, if a user is not an authorized requester in block 104, the method 100 may then advance to block 154 in FIG. 1D. In block 154, a determination may be made whether an authorized firewall (FW) requester link or the like was operated by the user. If the authorized firewall requester link is not operated in block 154, the method 100 may end at termination 156. If an authorized firewall requester link is operated in block 154, the method 100 may advance to block 158. Alternatively, the method 100 may automatically advance to block 158 if the user is not an authorized requester in block 104 (FIG. 1A).

In block 158, a list of authorized requesters may be presented to the user. In block 160, a determination may be made whether an authorized requester is associated with the user, such as by being part of the user's organization or line of business (LOB) or the like. If an authorized requester is part of the user's organization or LOB in block 160, the method 100 may advance to block 162. In block 162, the user may be instructed to contact an authorized requester associated with the user to enter and submit the rule request. The method may then return to block 106 where the authorized requester engaged by the user may proceed with method 100 as previously described.

Figure 5:
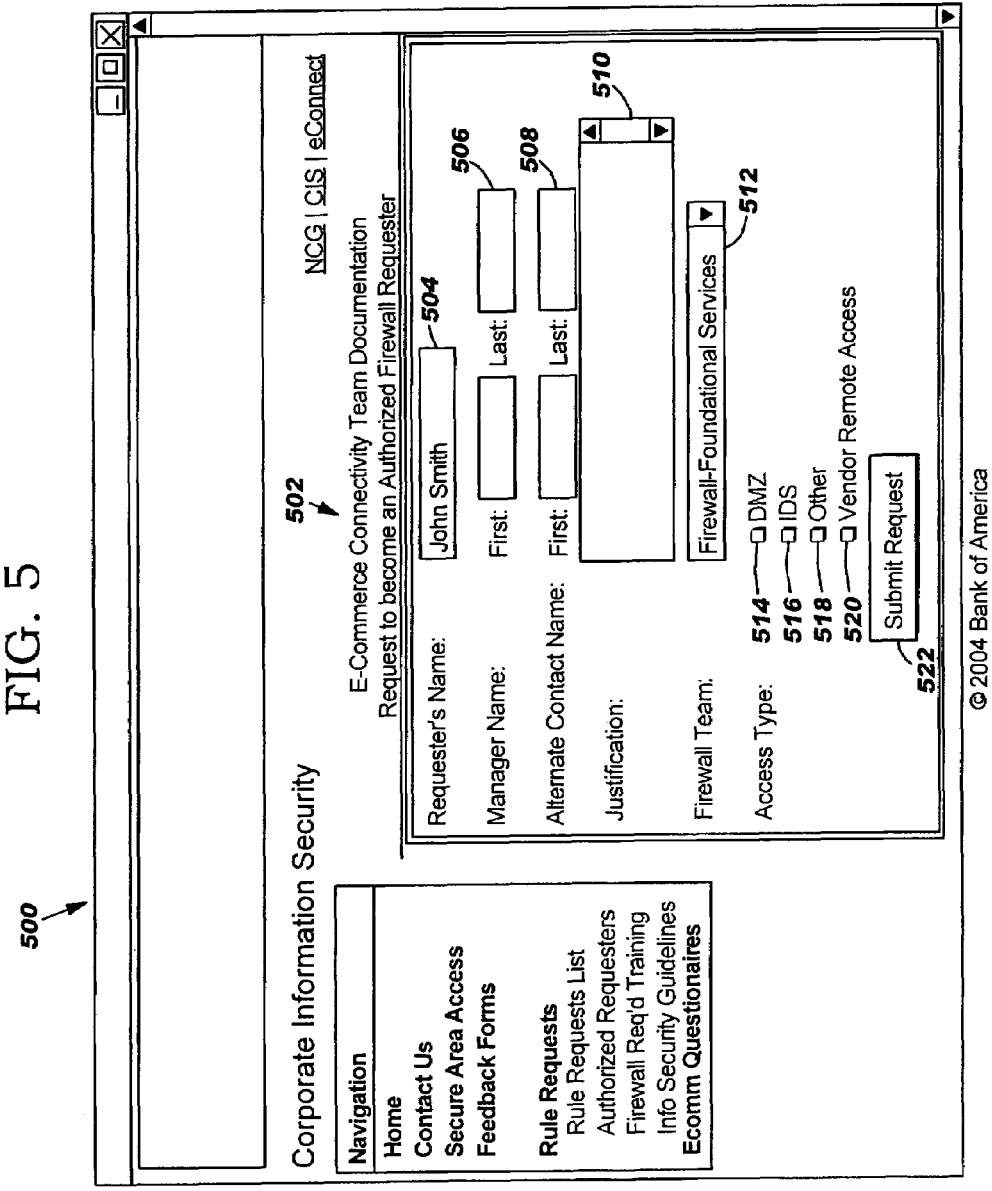
FIG. 5 is an example of a web page, GUI or the like of a request form to become an authorized rule requester in a risk management system in accordance with an embodiment of the present invention.

If an authorized requester is not associated with the user's organization, LOB or the like in block 160, the method 100 may advance to block 164. In block 164, a GUI or form may be presented to the user for the user to request to become an authorized requester. FIG. 5 is an example of a web page, GUI 500 or the like of a request form 502 to become an authorized rule requester in a risk management system in accordance with an embodiment of the present invention. The request form 502 may include fields to enter information, such as a requester's name field 504, manager's name field 506 and an alternate contact name field 508. The form 502 may also include a "Justification" field 510 to enter a justification or reasons why the requester should become an authorized requester. The form 502 may also include a field 512 to select a "Firewall Team" if there are different internal organizations that manage different firewalls. The form 502 may further include radio buttons 514-520 to select an access type. Examples of access types may include DMZ 514, IDS 516, Other 518, Vendor Remote Access 520, or similar categories of access type. After the form is completed the user or requester applicant may operate a "Submit Request" radio button 522 to submit the request or application to the appropriate authority for review and approval.

Returning to FIG. 1D, in block 166, a determination may be made whether the request form to become an authorized requester, such as form 502 of FIG. 5, has been completed. If the form has not been completed in block 166, the method 100 may end at termination 168. If the form has been completed in block 166, the method 100 may advance to block 170. In block 170, the completed form may be sent to a predetermined authority or level of management for approval. In block 172, a determination may be made whether the request to become an authorized requester has been approved. If not approved, the method 100 may advance to block 174. In block 174, an e-mail may be automatically sent to notify the user or requester with regard to the denial. In block 176, the user may contact the manager that denied the request to appeal the denial. Alternatively, the user may submit the rule request via an authorized requester similar to that previously described.

If the request to become an authorized requester is approved in block 172, the method 100 may advance to block 178. In block 178, the approved request may be sent to a firewall team manager or individual with a similar responsibility for maintaining the security of the firewall. In block 180, a determination may be made whether the firewall team manager approved the request to become an authorized requester. If the firewall team manager rejects the request in block 180, the method 100 may return to block 174 and the method 100 may proceed as previously described. If the request is approved by the firewall team manager in block 180, the method 100 may advance to block 182. In block 182, the user or requester may be entered in the list of authorized requesters. The method 100 may then return to block 106 (FIG. 1D) and the method 100 may proceed as previously described.

Figure 6:
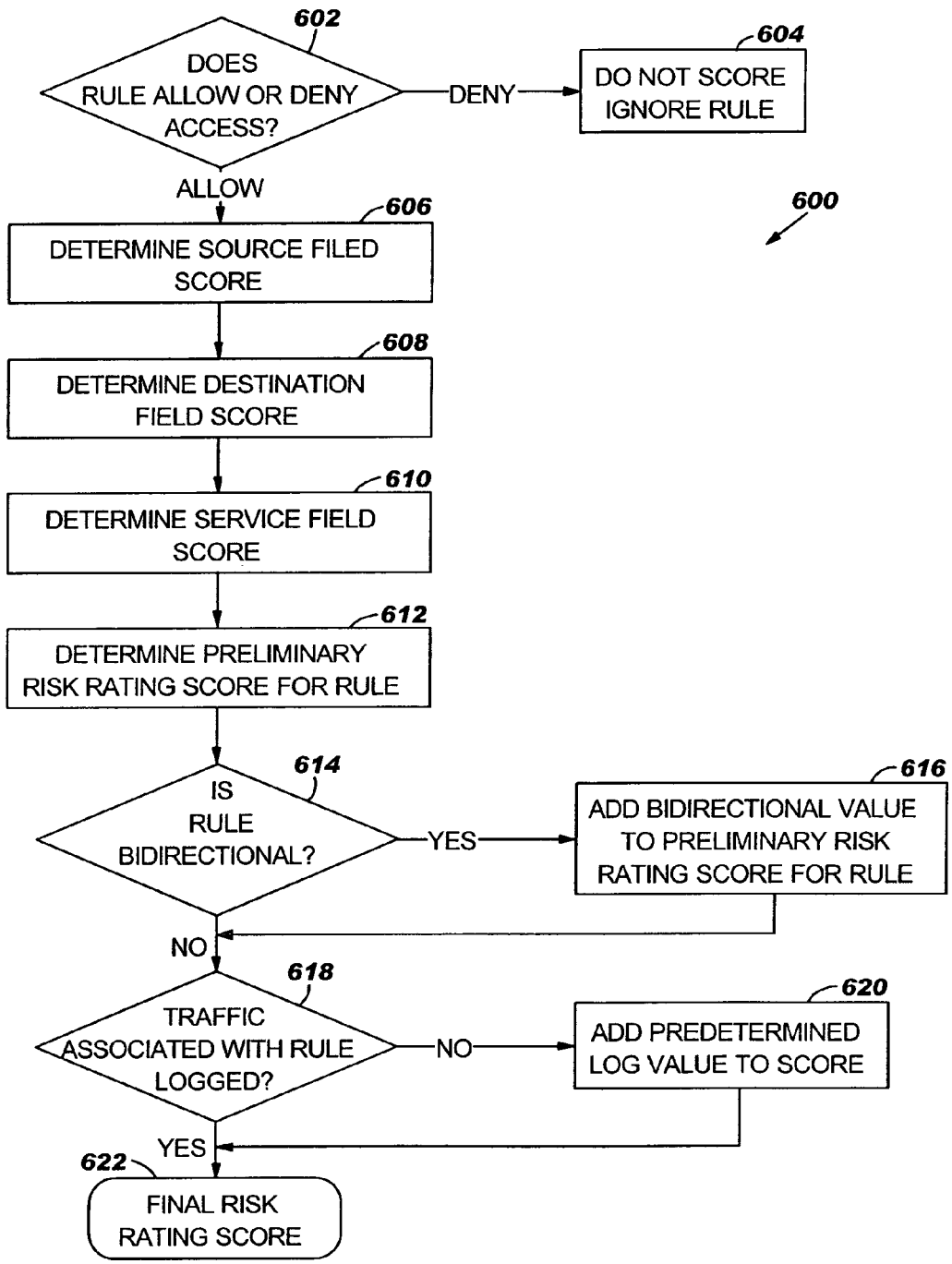
FIG. 6 is a flow chart of an example of a method for determining a risk rating score for a rule in an automated risk management system in accordance with an embodiment of the present invention.

FIG. 6 is a flow chart of an example of a method 600 for determining a risk rating score for a rule in an automated risk management system in accordance with an embodiment of the present invention. The method 600 may be used to calculate the risk rating score in block 120 of FIG. 1B. In block 602, a determination may be made whether the rule allows or denies access via the firewall or other access control device. If the rule denies access, the method 600 may advance to block 604. In block 604, the rule request will not be scored and the rule will be ignored because the rule may conflict with another active rule that allows access. If the rule is determined to allow access in block 602, the method 600 may advance to block 606. In block 606, a source field score may be determined from information entered into the source field 304 or 404 in GUI 300 or 400 of FIGS. 3 and 4, respectively. An example of a method 700 for determining a source field score will be describe hereinbelow with reference to FIG. 7. In block 608, a destination field score may be determined from information entered into the destination field 312 or 412 of GUI 300 or 400, respectively. An example of a method 800 for determining a destination field score will be described herein with reference to FIG. 8. In block 610, a service field score may be determined from information entered into the service field 320 or 420 of GUI 300 or 400, respectively. An example of a method 900 for determining a source field score will be described with reference to FIG. 9.

In block 612, a preliminary risk rating score for the rule may be determined. The preliminary risk rating score may be the product of the source field score from block 606, the destination field score from block 608 and the service field score from block 610.

In block 614, a determination may be made if the rule is bidirectional. The rule is bidirectional if both source and destination information is entered in source and destination fields 304 and 312 in GUI 300 (FIG. 3) or fields 404 and 412 in GUI 400 (FIG. 4). If the rule request is determined to be bidirectional in block 614, the method 600 may advance to block 616. In block 616, a predetermined bidirectional value may be added to the risk rating score for the rule to increase the risk associated with the rule as a result of being bidirectional. The bidirectional value may be determined or calculated by multiplying the score of bidirectional objects in the source and destination fields 304 and 312 or 404 and 412 by a preset bidirectional multiplier, for example 2 or other multiplier depending upon internal policies and level of risk an organization may deem a bidirectional rule may pose to the organization.

In block 618, a determination may be made whether the traffic associated with a rule will be logged or tracked, so that any attacks or other problems may be traced. If traffic associated with the rule is not logged, a predetermined log value may be added to the preliminary risk rating score to reflect the additional risk that may be associated with not logging traffic. The log value may be set at a number that reflects an organizations vision of increased risk as a result of not logging traffic and being able to trace attacks or problems. From block 618 or 620, the method 600 may advance to block 622. In block 622 a final risk rating score may result form block 618 or block 620. This final risk rating score may be used in block 120 of method 100 (FIG. 1B).

Figure 7:
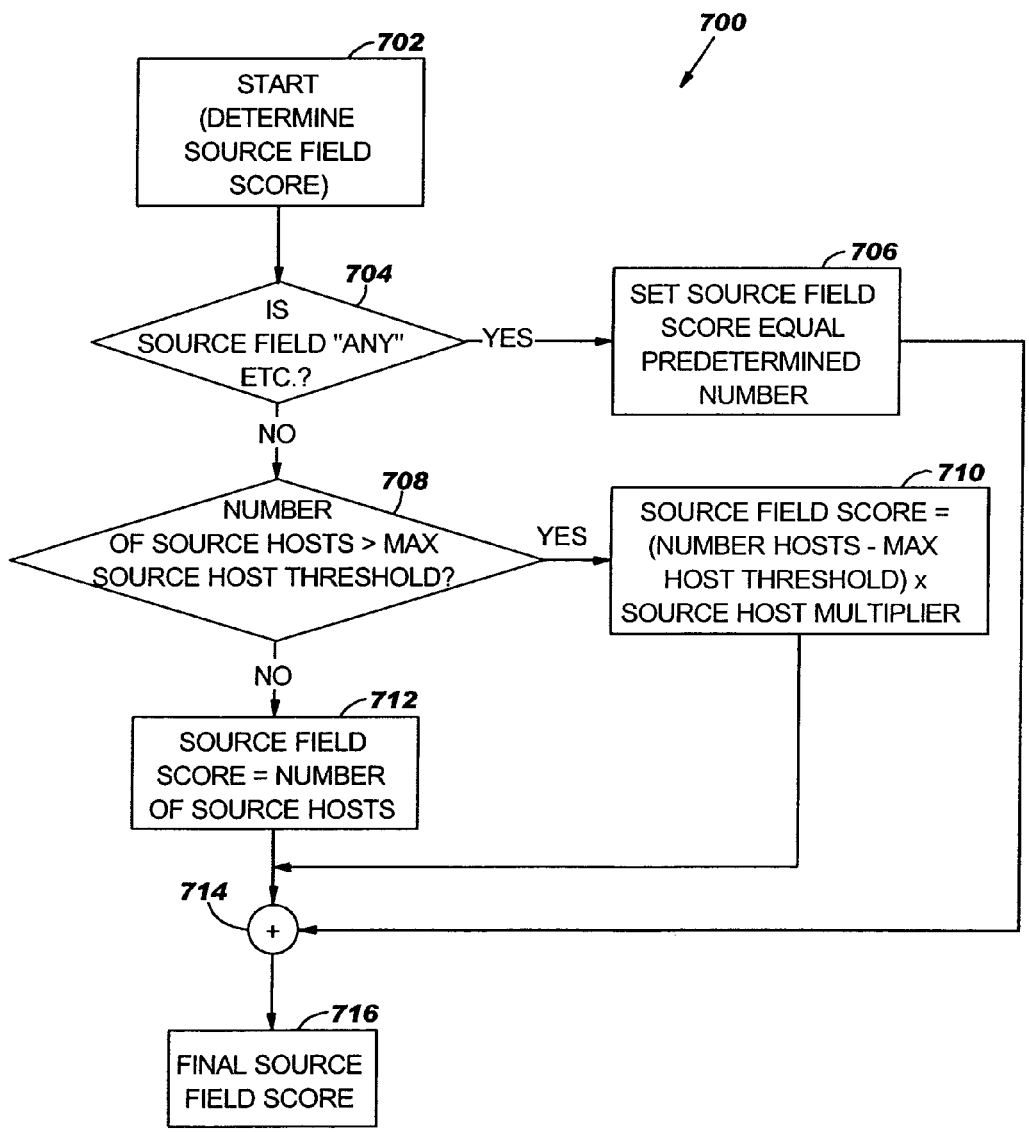
FIG. 7 is a flow chart of an example of a method for determining a source field score in an automated risk management system in accordance with an embodiment of the present invention.

FIG. 7 is a flow chart of an example of a method 700 for determining a source field score in an automated risk management system in accordance with an embodiment of the present invention. The method 700 may be used to determine the source field score in block 606 of method 600 (FIG. 6). In block 702, the method 700 to determine a source field score may start. In block 704, a determination may be made if "any" or a similar indication has been entered in source field or "Host IP Address(es) block 310 or 410 of GUI 300 or 400. If "any" has been entered in the source field or block 310 or 410, the source field score may be set to a predetermined number in block 706. The predetermined number for the source field score may reflect an organizations view of the level of risk associated with permitting any source access via a firewall or other access control device. Accordingly, a higher number would reflect greater risk.

If "any" or similar indication is not entered in the source field in block 704, the method 700 may advance to block 708. In block 708, a determination may be made whether the number of source hosts entered in the source field or block 310 or 410 exceeds a maximum source host threshold. The level of the maximum source host threshold will reflect an organizations view of the level of risk associated with permitting more than a threshold number of hosts. If the number of source hosts exceeds the threshold in block 708, the method 700 may advance to block 710. In block 710, the source field score may be set to equal the number of hosts minus the maximum host threshold with the result multiplied by a source host multiplier. Again, the size of the source host multiplier may reflect the organizations view of the level of risk associated with having more than a threshold number of source hosts.

If the number of source hosts does not exceed the maximum source host threshold in block 708, the method 700 may advance to block 712. In block 712, the source field score may be set to equal the number of source hosts entered in the source field or block 310 or 410. The different source field scores from blocks 706, 710 and 712 may be summed at a summing junction 714 to provide a final source field score in block 716. The final source field score in block 716 may be used in block 606 of method 600 (FIG. 6).

FIG. 8 is a flow chart of an example of a method 800 for determining a destination field score in an automated risk management system in accordance with an embodiment of the present invention. The method 800 may be used to determine the destination field score in block 608 of method 600 (FIG. 6). In block 802, the method 800 to determine a destination field score may start. In block 804, a determination may be made if "any" or a similar indication has been entered in the destination field or "Host IP Address(es)" block 318 or 418 of GUI 300 or 400. If "any" has been entered in the destination field 318 or 418, the destination field score may be set to a predetermined number in block 806. The predetermined number for the destination field score may reflect an organizations view of the level of risk associated with permitting access to any destination via a firewall or other access control device. Accordingly, a higher number would reflect greater risk.

If "any" or similar indication is not entered in the destination field in block 804, the method 800 may advance to block 808. In block 808, a determination may be made whether the number of destination hosts entered in the destination field or block 318 (FIG. 3) exceeds a maximum destination host threshold. The level of the maximum destination host threshold will reflect an organizations view of the level of risk associated with permitting more than a threshold number of destination hosts. If the number of destination hosts exceeds the threshold in block 808, the method 800 may advance to block 810. In block 810, the destination field score may be set to equal the number of destination hosts minus the maximum destination host threshold with the result being multiplied by a destination host multiplier. Again, the size of the destination host multiplier may reflect the organizations view of the level of risk associated with having more than a threshold number of destination hosts.

If the number of destination hosts does not exceed the maximum destination host threshold in block 808, the method 800 may advance to block 812. In block 812, the destination field score may be set to equal the number destination hosts entered in the destination field or block 318 or 418. The different destination field scores from blocks 806, 810 and 812 may be summed at summing junction 814 to provide a final destination field score in block 816. The final destination field score in block 816 may be used in block 608 of method 600 (FIG. 6).

FIG. 9 is a flow chart of an example of a method 900 for determining a service field score in an automated risk management system in accordance with an embodiment of the present invention. The method 900 may be used to determine the service field score in block 610 of method 600 (FIG. 6). In block 902, the method 900 to determine a service field score may start. In block 904, a determination may be made if "any" or a similar indication has been entered in the service field or the "Specify Ports" block 328 or 428 of GUI 300 or 400. If "any" has been entered in the service field or "Specify Ports" block 328 or 428, the service field score may be set to a predetermined number in block 906. The predetermined number for the service field score may reflect an organizations view of the level of risk associated with permitting access through any port via a firewall or other access control device. Accordingly, a higher number would reflect greater risk potential.

If "any" or similar indication is not entered in the service field in block 904, the method 900 may advance to block 908. In block 808, a determination may be made whether the service is UDP or if the UDP button 324 is selected in GUI 300. If UDP service is selected, the method 900 may advance to block 910. In block 910, the service field score may be set to equal the number of ports specified in block 328 multiplied by a port multiplier for UDP type service. The size of the port multiplier may reflect the organizations view of the level of risk associated with UDP type service with a higher number corresponding to a higher level of perceived risk.

If UDP is determined not to be the type service in block 908, the method 900 may advance to block 912. In block 912, the service field score may be set to equal the number of ports entered or indicated by the ports specified in block 328 or 428 of the service field 320 or 420 multiplied by an appropriate port multiplier based on the type of service selected in service field 320 (TCP 322, ICMP 326 or other service type). The different service field scores from blocks 906, 910 and 912 may be summed at a summing junction 914. In block 916, the service field score resulting from summing junction 914 may be compared to a preset or predetermined threshold service field score in decision block 916. If the service field score exceeds the threshold in block 916, the method 900 may advance to block 918. In block 918, the service field score may be set equal to the service field score minus a predetermined service threshold. From block 918 the method 900 may advance to block 920 where the final service field score will be the difference between the service field score and the threshold.

If the service field score from the summing junction 914 does not exceed the threshold in block 916, the final service field score in block 920 may be the service field score from the summing junction 914. The final service field score in block 920 may be used in block 610 of method 600 (FIG. 6).

Figure 10B:
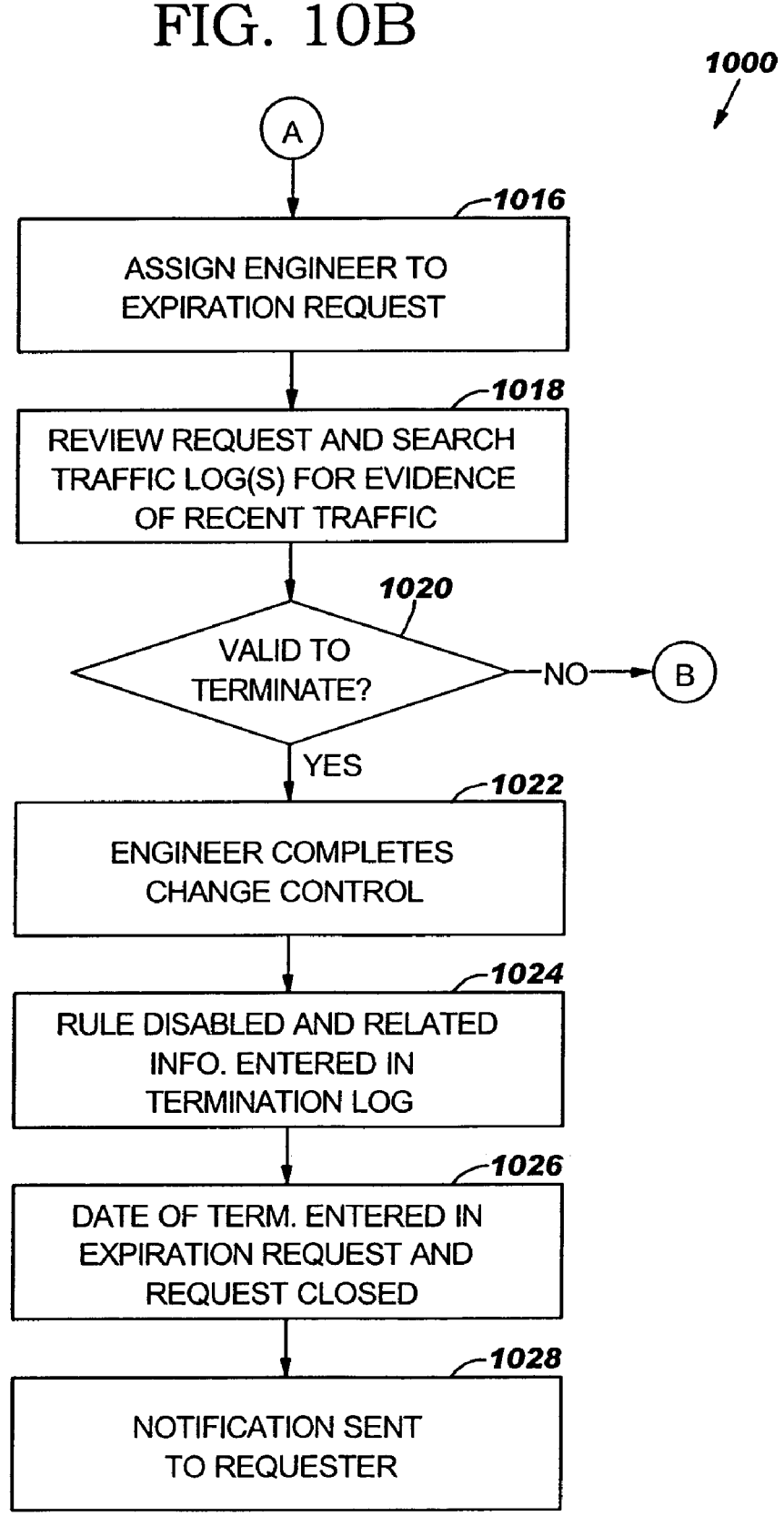
Figure 10C:
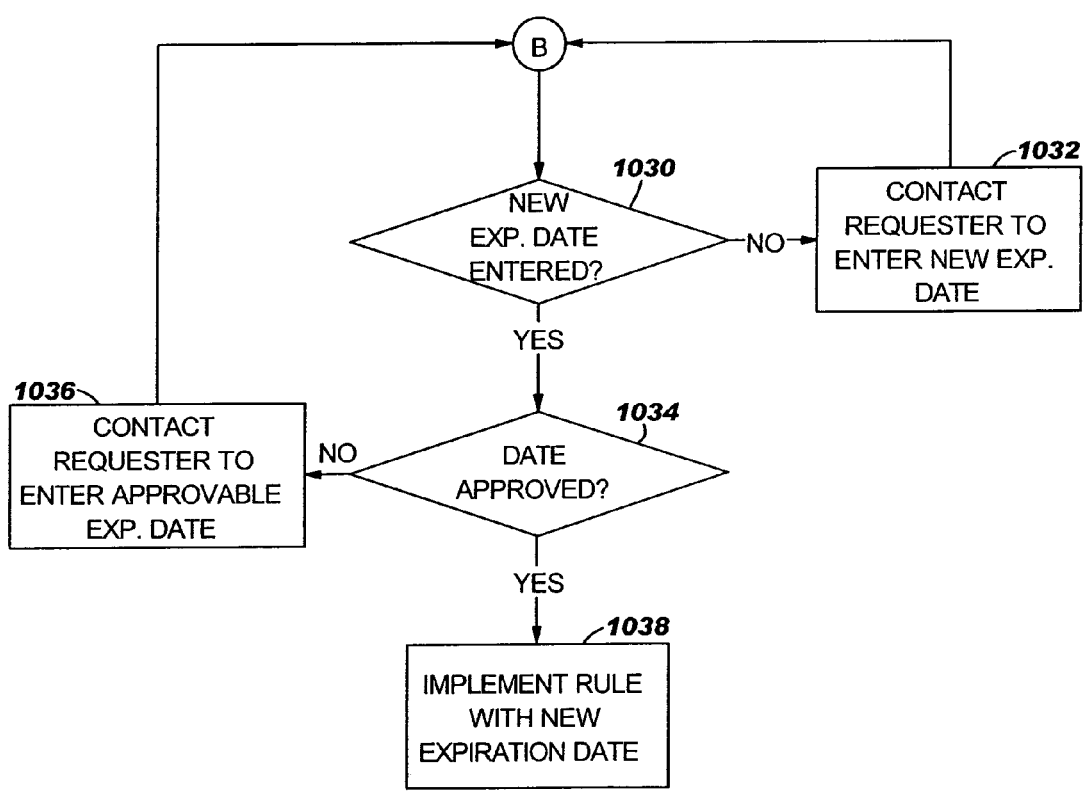

FIGS. 10A, 10B and 10C (collectively FIG. 10) are a flow chart of an example of a method 1000 for reviewing a rule prior to expiration in an automated risk management system in accordance with an embodiment of the present invention. In block 1002, a selected expiration date may be entered in the rule request. This may be the same as the termination date entered in field or block 214 of GUI 200 (FIG. 2). The system may be set so that a rule is required to expire after a preset or predetermined time period, such as two years. This insures that all rules are periodically reviewed in the event standards have changed and to determine if a rule is still viable or is still being used. The forced review of rules with respect to expiration after a predetermined time period also permits rules that are no longer compliant with standards or are not longer being used to be disabled or inactivated.

In block 1004, an expiration request and/or notification may be automatically generated a predetermined time period prior to the expiration date. The expiration request and/or notification may be sent to management within the firewall management and maintenance organization. In block 1006, the notification may be sent to the original requester of the rule or to a surrogate, if the original requester is no longer available, to notify the requester or surrogate of a pending review and possible deletion or disabling of the rule.

In block 1008, the requester or surrogate may review need for the original rule request and the continued need for the rule. In block 1010, a determination may be made whether the rule is still needed. If the determination in block 1010 is that the rule is no longer needed, in block 1014, a notification of an intent to delete or disable the rule may be sent to appropriate individuals or groups within the organization, such as the firewall team or organization and any others who may be affected by the rule change. If the determination in block 1010 is that the rule is still needed, in block 1012, the system may be accessed to submit a new expiration date and justification. The new expiration date and justification date may be entered into the GUI 200 for the original rule request or a GUI similar to GUI 200.

The method 1000 may advance form block 1012 or 1014 to block 1016 (FIG. 10B). In block 1016, the expiration request may be assigned to a engineer. In block 1018, the engineer may review the expiration request and search any traffic logs for evidence of continued traffic. In block 1020, a determination may be made whether termination or disablement of the rule is valid. For example, even if a determination is made in block 1010 that the rule is no longer needed and a notification of intent to delete is issued in block 1014, organizational policy may dictate that termination of the rule may be invalid if there is evidence of recent traffic associated with the rule in block 1018 or there is some other policy reason or other reason not to terminate or disable the rule.

If a determination is made in block 1020 that the rule can be validly terminated, the method 1000 may advance to block 1022. In block 1022, the engineer may complete a change control to insure that there are no conflicts with other rules or that anyone may be adversely affected by disabling the rule. In block 1024, the rule may be disabled and information related to disablement of the rule entered in a termination log. This information may facilitate reactivation of the rule if need be or for other administrative purposes. In block 1026, a date of termination or disablement may be entered in the expiration request and the request closed. In block 1028, a notification of disablement or termination of the rule may be sent to the requester or surrogate.

Returning to block 1020, if a determination is made that termination of the rule is invalid for some reason, such as recent traffic related to the rule, the requester indicates the rule is still needed or some other valid reason, the method 1000 may advance to block 1030. In block 1030, a determination may be made if a new expiration date for the rule has been entered. If a new expiration date has not been entered in block 1030, the method 1000 may advance to block 1032. In block 1032, the requester or surrogate may be contacted to enter a new expiration date. The method 1000 may then return to block 1030 and remain in this loop until a new expiration date is entered.

If a new expiration date for the rule has been entered in block 1030, the method 1000 may advance to block 1034. In block 1034 a determination may be made if the new expiration date has been approved. The new expiration date may be approved if set within any predetermined maximum expiration time period for another expiration review, such as two years. If the new expiration date is not approved in block 1034, the method 1000 may advance to block 1036. In block 1036, the requester or surrogate may be contacted to enter an approvable expiration date, such as a date within the predetermined maximum expiration time period for the next review of the rule with respect to disablement or termination. If the new expiration date is approved in block 1034, the rule may be implemented with the new expiration date in block 1038.

FIG. 11 is a block diagram of an exemplary system 1100 for automated risk management in accordance with an embodiment of the present invention. The elements of the methods 100, 600, 700, 800, 900 and 1000 may be embodied in and performed by the system 1100. The system 1100 may include one or more user or client computer systems 1102 or similar systems or devices.

The computer system 1102 may include a system memory or local file system 1104. The system memory 1104 may include a read only memory (ROM) and a random access memory (RAM). The ROM may include a basic input/output system (BIOS). The BIOS may contain basic routines that help to transfer information between elements or components of the computer system 1102. The RAM 1108 may contain an operating system 1106 to control overall operation of the computer system 1102. The RAM may also include a browser 1108 or web browser. The RAM may also include data structures 1110 or computer-executable code for automatic risk management that may be similar or include elements of the methods 100 and 600-1000 of FIGS. 1 and 6-10, respectively. The RAM may further include other application programs 1112, other program modules, data, files and the like.

The computer system 1102 may also include a processor or processing unit 1114 to control operations of the other components of the computer system 1102. The operating system 1106, browser 1108, data structures 1110 and other program modules 1112 may be operable on the processor 1114. The processor 1114 may be coupled to the memory system 1104 and other components of the computer system 1102 by a system bus 1116.

The computer system 1102 may also include multiple input devices, output devices or combination input/output devices 1118. Each input/output device 1118 may be coupled to the system bus 1116 by an input/output interface (not shown in FIG. 11). The input and output devices or combination I/O devices 1118 permit a user to operate and interface with the computer system 1102 and to control operation of the browser 1108 and data structures 1110 to access, operate and control the automated risk management system. The I/O devices 1118 may include a keyboard and computer pointing device or the like to perform the operations discussed herein.

The I/O devices 1118 may also include disk drives, optical, mechanical, magnetic, or infrared input/output devices, modems or the like. The I/O devices 1118 may be used to access a medium 1120. The medium 1120 may contain, store, communicate or transport computer-readable or computer-executable instructions or other information for use by or in connection with a system, such as the computer systems 1102.

The computer system 1102 may also include or be connected other devices, such as a display or monitor 1122. The monitor 1122 may be used to permit the user to interface with the computer system 1102. The monitor 1122 may present the GUIs 200-500 or web pages represented in FIGS. 2-5 to a user or requester that may be generated by the data structures 1110 for automated risk management of rule-based firewall security.

The computer system 1102 may also include a hard disk drive 1123. The hard drive 1123 may be coupled to the system bus 1116 by a hard drive interface (not shown in FIG. 11). The hard drive 1123 may also form part of the local file system or system memory 1104. Programs, software and data may be transferred and exchanged between the system memory 1104 and the hard drive 1123 for operation of the computer system 1102.

The computer systems 1102 may communicate with a remote server 1124 and may access other servers or other computer systems (not shown) similar to computer system 1102 via a network 1126. The system bus 1116 may be coupled to the network 1126 by a network interface 1128. The network interface 1128 may be a modem, Ethernet card, router, gateway or the like for coupling to the network 1126. The coupling may be a wired connection or wireless. The network 1126 may be the Internet, private network, an intranet or the like.

The server 1124 may also include a system memory 1130 that include a file system, ROM, RAM and the like. The system memory may include an operating system 1132 similar to operating system 1106 in computer system 1102. The system memory 1130 may also include data structures 1134 for automated risk management for rule-based security. The data structures 1134 may include operations similar to those described with respect to methods 100 and 600-1000 for automated risk management in FIG. 1 and FIGS. 6-10, respectively. Clients, such as computer systems 1102 or the like, may access the data structures 1134 for automated risk management in accordance with an embodiment of the present invention.

The server system memory 1130 may also include other files 1136, applications, modules and the like. The system memory 1130 may further include a traffic log 1138 and a termination log 1140. As previously discussed, the traffic log 1138 may be used to log traffic or data transfers related to a rule and the termination log 1140 may be used to log information related to termination or disablement of a rule.

The server 1124 may also include a processor 1142 or a processing unit to control operation of other devices in the server 1124. The server 1142 may also include I/O device 1144. The I/O devices 1144 may be similar to I/O devices 1118 of computer systems 1102. The server 1124 may further include other devices 1146, such as a monitor or the like to provide an interface along with the I/O devices 1144 to the server 1124. The server 1124 may also include a hard disk drive 1148. A system bus 1150 may connect the different components of the server 1124. A network interface 1152 may couple the server 1124 to the network 1126 via the system bus 1150.

Elements of the present invention, such as methods 100 and 600-1000 of FIGS. 1 and 6-10 and system 1100 of FIG. 11, may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in the medium for use by or in connection with a system, such as system 1100 of FIG. 11. Examples of such a medium may be illustrated in FIG. 11 as network 1126 or medium 1120 and I/O devices 1118 and 1144. A computer-usable or readable medium may be any medium that may contain, store, communicate or transport the program for use by or in connection with a system. The medium, for example, may be an electronic, magnetic, optical, electromagnetic, infrared or semiconductor system or the like.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for automated risk management, comprising:
   presenting a rule request graphical user interface (GUI) for a requester to enter information related to a rule request for creating a rule to be used for determining access to a system;
   determining a risk rating score for the rule before implementation based on information entered in the rule request GUI, wherein the GUI includes a field for each of source information, destination information, service information and port information;
   permitting the rule to be reviewed and approved based on the risk rating score; and
   permitting control of traffic and data between sources and destinations and a type of service for such traffic and data based on information entered into the rule request GUI and implementation of the rule.

2. The method of claim 1, further comprising escalating review of the rule request to predetermined levels of management based on the predetermined level or range of the risk rating score.

3. The method of claim 1, wherein determining the risk rating score comprises at least one of:
   determining a source field score;
   determining a destination field score; and
   determining a service field score.

4. The method of claim 3, wherein determining a source field score comprises:
   setting the source field score to a predetermined number in response to a requester entering an indication of any source in a source field of the rule request GUI;
   setting the source field score to a number that is a function of a source host multiplier multiplied by a difference between a maximum source host threshold and a number of source hosts entered by the requester in a source field of the rule request GUI, in response to the number of source hosts entered by the requester exceeding the maximum source host threshold; and setting the source field score to the number of source hosts entered by the requester in the source field in response to the number of source hosts being less than the maximum source host threshold.

5. The method of claim 3, wherein determining the destination field score comprises:

setting the destination field score to a predetermined number in response to a requester entering an indication of any destination in a destination field of the rule request GUI;

setting the destination field score to a number that is a function of a destination host multiplier multiplied by a difference between a maximum destination host threshold and a number of destination hosts entered by the requester in the destination field of the rule request GUI, in response to the number of destination hosts entered by the requester exceeding the maximum destination host threshold; and setting the destination field score to the number of destination hosts entered by the requester in the destination field in response to the number of destination hosts being less than the maximum destination host threshold.

6. The method of claim 3, wherein determining the service field score comprises:

setting the service field score to a predetermined number in response to a requester entering an indication of any service in a service field of the rule request GUI;

setting the service field score to a number that is a function of a number of ports entered by the requester in the service field multiplied by a predetermined port multiplier corresponding to a specific type of service entered or selected by the requester in the rule request GUI;

subtracting a maximum service threshold from the service field score to provide a final service field score in response to the service field score exceeding the maximum service threshold.

7. The method of claim 3, wherein determining the risk rating score comprises determining a product of the source field score, the destination score and the service field score.

8. The method of claim 1, further comprising adding a bidirectional value to the risk rating score in response to the rule request being bidirectional.

9. The method of claim 8, further comprising determining a bidirectional value by multiplying a bidirectional multiplier times a number of bidirectional objects in a source field and a destination field of the rule request GUI.

10. The method of claim 1, further comprising adding a log value to the risk rating score in response to not logging traffic related to the rule.

11. The method of claim 1, further comprising presenting a list of authorized requesters to a user in response to the user not being an authorized requester.

12. The method of claim 11, further comprising presenting a request to become an authorized requester GUI form to the user in response to no authorized requester being associated with the user.

13. The method of claim 1, further comprising requiring a requester to enter an expiration date that does not exceed a selected time period in the rule request.

14. The method of claim 13, further comprising generating a notification of pending review of the rule prior to the expiration date of the rule.

15. The method of claim 13, further comprising presenting a GUI to submit a new expiration date and justification for the rule in response to the rule still being needed.

16. The method of claim 13, further comprising providing a traffic log to search for traffic associated with the rule.

17. The method of claim 13, further comprising:

disabling the rule in response to the rule no longer being needed; and providing a termination log to enter information related to the rule in response to the rule being disabled.

18. The method of claim 1, further comprising implementing or not implementing the rule in response to a predetermined level or range of the risk rating score.

19. A method for automated risk management, comprising:

presenting a rule request graphical user interface (GUI) for a requester to enter information related to a rule request for creating a rule to be used for determining access to a system;

determining a risk rating score for the rule before implementation based on information entered in the rule request GUI, wherein the GUI includes a field for each of source information, destination information, service information and port information;

permitting control of traffic and data between sources and destinations and a type of service for such traffic and data based on information entered into the rule request GUI;

sending an expiration notification to the requester or a surrogate a predetermined time period prior to an expiration date of a rule; and determining a validity of termination of the rule prior to disabling the rule.

20. The method of claim 19, wherein determining a validity of termination comprises:

determining if the rule is still needed; and reviewing a traffic log for traffic related to the rule.

21. The method of claim 19, further comprising entering information related to the rule in a termination log in response to disabling the rule.

22. The method of claim 19, further comprising:

contacting the requester to enter a new expiration date in response to the rule still being needed and a new expiration date not having been entered; and implementing the rule with a new expiration date in response to a new expiration date being entered.

23. The method of claim 19, further comprising sending a notification of termination of the rule to the requester in response to the rule being disabled.

24. A system for automated risk management, comprising:

a processor;

a data structure operable on the processor to present a rule request GUI for a requester to enter information related to a rule request for creating a rule to be used for determining access to a system;

a data structure operable on the processor to determine a risk rating score for the rule before implementation based on information entered in the rule request GUI, wherein the GUI includes a field for each of source information, destination information, service information and port information; and a data structure operable on the processor to permitting control of traffic and data between sources and destinations and a type of service for such traffic and data based on information entered into the rule request GUI.

25. The system of claim 24, further comprising:

a data structure operable on the processor to present the risk rating score to the requester; and a data structure operable on the processor to permit the requester to edit information entered in the rule request GUI to obtain a lower risk rating score.

26. The system of claim 24, further comprising a data structure operable on the processor to escalate a review of the rule request to a predetermined level of management based on a predetermined level or range of the risk rating score.

27. The system of claim 24, wherein the data structure operable on the processor to determine the risk rating score comprises at least one of:
   a data structure operable on the processor to determine a source field score;
   a data structure operable on the processor to determine a destination field score; and
   a data structure operable on the processor to determine a service field score.

28. The system of claim 27, wherein the data structure operable on the processor to determine the risk rating score comprises a data structure to determine a product of the source field score, the destination field score and the service field score.

29. The system of claim 24, further comprising a data structure operable on the processor to generate and send a notification of a pending review of the rule prior to an expiration date of the rule.

30. The system of claim 29, further comprising a data structure operable on the processor to provide a GUI to submit a new expiration date and justification for the rule in response to the rule still being needed after a review of the rule.

31. The system of claim 29, further comprising:
   a data structure operable on the processor to disable the rule in response to the rule no longer being needed; and
   a termination log to enter information related to the rule in response to the rule being disabled.

32. The system of claim 24, further comprising a traffic log to log traffic related to the rule.

33. A computer program product for automated risk management, the computer program product comprising:
   a computer readable medium having computer readable program code embodied therein, the computer readable medium including:
   computer readable program code configured to present a rule request GUI for a requester to enter information related to a rule request for a rule to be used for determining access to a system;
   computer readable program code configured to determine a risk rating score for the rule before implementation based on information entered in the rule request GUI, wherein the GUI includes a field for each of source information, destination information, service information and port information; and
   computer readable program code configured to permit control of traffic and data between sources and destinations and a type of service for such traffic and data based on information entered into the rule request GUI.

34. The computer program product of claim 33, further comprising computer readable program code configured to escalate a review of the rule request to a predetermined level of management based on a predetermined level or range of the risk rating score.

35. The computer program product of claim 33, further comprising:
   computer readable program code configured to present the risk rating score to the requester; and
   computer readable program code configured to permit the requester to edit information entered in the rule request GUI to obtain a lower risk rating score.

36. The computer program product of claim 33, wherein the computer readable program code configured to determine a risk rating score comprises at least one of:
   computer readable program code configured to determine a source field score;
   computer readable program code configured to determine a destination field score; and
   computer readable program code configured to determine a service field score.

37. The computer program product of claim 36, wherein the computer readable program code configured to determine a risk rating score further comprises computer readable program code configured to determine the risk rating score based on the source field score, the destination field score and the service field score.

38. The computer program product of claim 33, further comprising computer readable program code configured to generate and send a notification of a pending review of the rule prior to an expiration date of the rule.

39. The computer program product of claim 38, further comprising computer readable program code configured to provide a GUI to submit a new expiration date and justification for the rule in response to the rule still being needed after a review of the rule.

40. A method for automated risk management, comprising:
   presenting a rule request graphical user interface (GUI) for a requester to enter information related to a rule request for creating a rule to be used for determining access to a system;
   determining a risk rating score for the rule before implementation based on information entered in the rule request GUI, wherein the GUI includes a field for each of source information, destination information, service information and port information; and
   permitting control of traffic and data between sources and destinations and a type of service for such traffic and data based on information entered into the rule request GUI.

* * * * *